(12) United States Patent  (10) Patent No.: US 7,598,464 B2
Deng  (45) Date of Patent: Oct. 6, 2009

(54) FOOD TREATING APPARATUS WITH A WEIGHING SCALE

(75) Inventor: Zhiming Deng, No. 1, Lane 3, Huanlian Dong Rd., Leliu Town, Shunde District, Foshan City, Guangdong, 528322 (CN)

(73) Assignee: Zhiming Deng, Guangdong (CN)

( * ) Notice: Subject to any disclaimer, the term of this patent is extended or adjusted under 35 U.S.C. 154(b) by 0 days.

(21) Appl. No.: 10/578,480

(22) PCT Filed: Nov. 4, 2004

(86) PCT No.: PCT/CN2004/001258

§ 371 (c)(1),
(2), (4) Date: Mar. 5, 2007

(87) PCT Pub. No.: WO2005/048797

PCT Pub. Date: Jun. 2, 2005

(65) Prior Publication Data

US 2007/0151774 A1  Jul. 5, 2007

(30) Foreign Application Priority Data

Nov. 7, 2003  (CN) .................... 2003 1 0112060

(51) Int. Cl.
*G01G 19/52* (2006.01)

(52) U.S. Cl. .................. 177/144; 99/493; 241/101.3; 366/141; 177/245

(58) Field of Classification Search ........... 177/144, 177/180, 238, 244, 245; 366/141; 241/101.2; 99/493, 485

See application file for complete search history.

(56) References Cited

U.S. PATENT DOCUMENTS

| 3,027,215 A | * | 3/1962 | Duncan .................... 312/245 |
| 4,362,219 A | * | 12/1982 | Carlsson .................... 177/245 |
| 4,582,151 A | * | 4/1986 | Mairot et al. ............... 177/144 |
| 4,672,181 A | * | 6/1987 | Sakamoto et al. ........... 219/518 |
| 5,174,403 A | * | 12/1992 | Geiger ..................... 177/245 |
| 5,329,069 A | * | 7/1994 | Amsel et al. ............... 177/245 |
| 5,617,648 A | * | 4/1997 | Leisinger et al. ............ 34/226 |
| 5,799,567 A | * | 9/1998 | Dorner ..................... 99/348 |
| 6,255,603 B1 | * | 7/2001 | Spannagel et al. .......... 177/180 |
| 6,302,577 B1 | * | 10/2001 | Jennings et al. ............ 374/14 |
| 6,371,584 B1 | * | 4/2002 | Alreck .................... 312/235.1 |
| 6,403,897 B1 | * | 6/2002 | Bluth et al. ................ 177/144 |
| 6,686,545 B2 | * | 2/2004 | Luchinger et al. .......... 177/180 |
| 7,138,586 B1 | * | 11/2006 | Kim ....................... 177/126 |
| 7,355,131 B2 | * | 4/2008 | Pathmanathan et al. ..... 177/144 |

* cited by examiner

Primary Examiner—Randy W Gibson
(74) Attorney, Agent, or Firm—Kening Li

(57) ABSTRACT

A food treating apparatus with a weighing scale. The weighing scale includes a casing, a weight display and a weighing pan. The casing of the weighing scale is provided with a sliding rail or a sliding plate. Correspondingly, the main body of the food treating apparatus is provided with a chamber to accommodate the weighing scale, and within the chamber, a guiding rail is provided for use in conjunction with the sliding rail or sliding plate. The weighing scale can be drawn into or out of the food treating apparatus along the guiding rail. The food treating apparatus with the weighing scale disclosed in the present invention is simple in structure, low in cost and easy to use.

3 Claims, 3 Drawing Sheets

FOOD TREATING APPARATUS WITH A WEIGHING SCALE

FIELD OF THE INVENTION

The present invention relates to a food treating apparatus. More specifically, it relates to a food treating apparatus with a weighing scale.

BACKGROUND OF THE INVENTION

Various types of food treating apparatuses are available in the market. For example, people use refrigerators to preserve food and mixers or microwave ovens to process food. With the improvement of people's living standards, more and more attentions are paid to the health aspect of daily life, especially to the amount of food taken and the content of ingredients. However, since food treating apparatuses disclosed in the art do not possess the weighing function, people have to use a separate weighing scale when they wish to measure the weight of food. This brings a lot of inconvenience and hence such food treating apparatuses are unable to meet the needs for health.

SUMMARY OF THE INVENTION

It is therefore an object of the present invention to overcome the above-mentioned disadvantages and to provide a food treating apparatus which is configured with a weighing scale and which is simple in structure, low in cost and easy to use.

The objects of the present invention will be achieved by the following described food treating apparatus.

According to the present invention, a food treating apparatus with a weighing scale is provided which includes a main body and a weighing scale. The weighing scale includes a casing or a shell, a weight display device and a weighing pan. On the casing of the weighing scale, a sliding rail or a sliding plate is provided. The main body of the food treating apparatus includes correspondingly a chamber or a cavity to accommodate the weighing scale. A guiding rail is correspondingly configured within the chamber for use in conjunction with the sliding rail or sliding plate. Along the guiding rail, the weighing scale can be slid into or out of the main body of the food treating apparatus.

Preferably, the objects of this invention can be reached by the embodiments as described herein below, but this invention is not limited to these embodiments in any sense.

The sliding rail or sliding plate can be fixedly mounted onto the bottom portion or the upper portion of the casing of the weighing scale, or the sliding rail or sliding plate can be made integrally with the casing of the weighing scale by injection moulding.

block member can be provided at the terminal end of the sliding rail or sliding plate so as to secure it at the guiding rail. The terminal end of the sliding rail or sliding plate is secured at the guiding rail so that it will not slide out of the guiding rail. An ornamental baffle is arranged at the front end of the sliding rail or sliding plate. The baffle can perfectly seal the opening of the chamber and the exterior of the main body of the food treating apparatus. The baffle may be formed integrally with the sliding rail or sliding plate. When the weighing scale is arranged within the chamber of the main body of the food treating apparatus, the baffle connected with the weighing scale may completely seal the opening of the chamber, and will not affect the exterior appearance of the main body of the food treating apparatus.

The weight display device can be connected to the weighing pan via a support rod, which is formed by a plural of detachable segments. The highest point of the segments of the support rod, which is fixedly connected to the weight display device, shall not be higher than the top of the chamber. In this way, the weighing pan may be removed in order to accommodate the weight display device within the chamber.

The weight display device can be a spring scale which includes a spring, a support rod and a dial.

Alternatively, the weight display device can be an electronic scale which includes a support rod, a weight sensor, a liquid crystal display and a scaling electronic circuit.

The food treating apparatus disclosed in the present invention exhibits the following outstanding advantages.

Firstly, a chamber or a cavity is provided within the main body of the food treating apparatus. The sliding rail or sliding plate of the weighing scale can be slid along the guiding rail disposed in the chamber. In this way, the weighing scale can be placed within the main body of the food treating apparatus when not in use. Such a food treating apparatus is simple in structure and low is cost.

Secondly, a food treating apparatus with a weighing scale will provide great convenience for measuring food weight before processing food.

Thirdly, since the weighing scale in the present invention can be slid into and out of the main body of the food treating apparatus, it is easy for people to adjust and maintain it.

Finally, since the weighing scale in the present invention can be placed within the chamber of the main body of the food treating apparatus when not in use, the apparatus itself shall possess an aesthetic appearance.

DETAILED DESCRIPTION OF PREFERRED EMBODIMENTS

Figure 1:
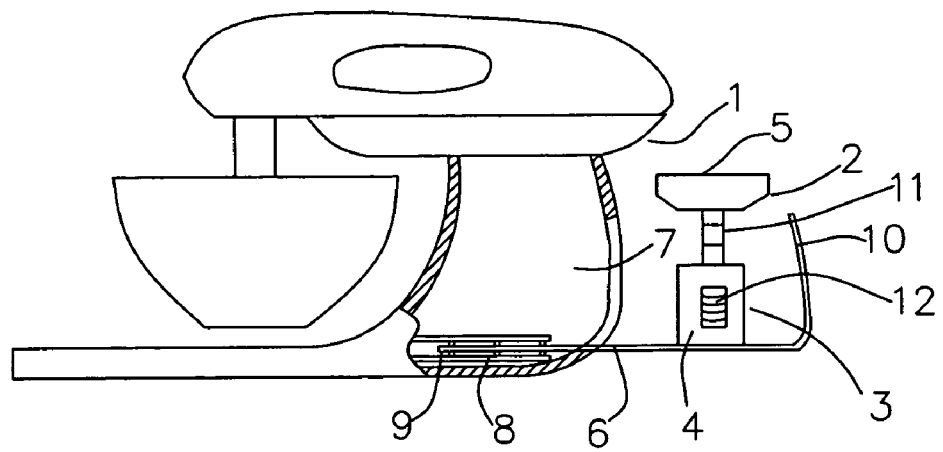
FIG. 1 schematically illustrates a weighing scale being arranged to a food mixer according to one embodiment of the present invention.

As shown in FIG. 1, in accordance with one embodiment of the present invention, a food mixer configured with an electronic weighing scale includes a main body 1 and a weighing scale 2 provided within the main body 1. The weighing scale 2 includes a casing 3, a weight display device 4 and a weighing pan 5. On the casing 3 a sliding rail or sliding plate 6 is provided. Correspondingly, a chamber 7 is provided within the main body 1 to accommodate the weighing scale 2. On one side wall of the chamber 7, a guiding rail 8 is provided for use in conjunction with the sliding rail or sliding plate 6. The sliding rail or sliding plate 6 is secured at the bottom of the casing 3, the sliding rail or sliding plate 6 being formed integrally with the casing 3 by injection moulding. A blocking member 9 is provided at the terminal end of the sliding rail or sliding plate 6 so as to secure the sliding rail or sliding plate 6 at the guiding rail 8. At the front end of the sliding rail or sliding plate 6, an ornamental baffle 10 is provided. The ornamental baffle 10 is formed integrally with the sliding rail or sliding plate 6, and can completely seal the opening of the chamber 7 of the main body 1 and the exterior surface of the main body 1. The weight display device 4 is an electronic scale which includes a support rod 11, a weight sensor, a liquid crystal display 12 and a scaling circuit.

Figure 2:
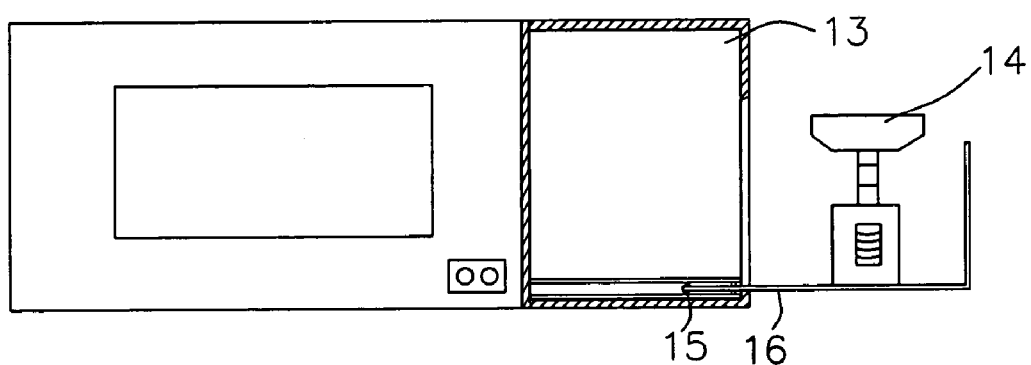
FIG. 2 schematically illustrates a weighing scale being arranged to a micro-wave oven according to another embodiment of the present invention.

In FIG. 2, in another embodiment of the present invention, a microwave oven arranged with an electronic scale is shown. The configuration of this embodiment is similar to that of the food mixer described above. The difference is that, at one side of the microwave oven, there is provided with a heat insulating box 13. The box 13 functions as a chamber to accommodate the weighing scale 14. Within the box 13, a guiding rail 16 is provided for use in conjunction with the sliding rail or sliding plate 15 of the weighing scale 14.

Figure 3:
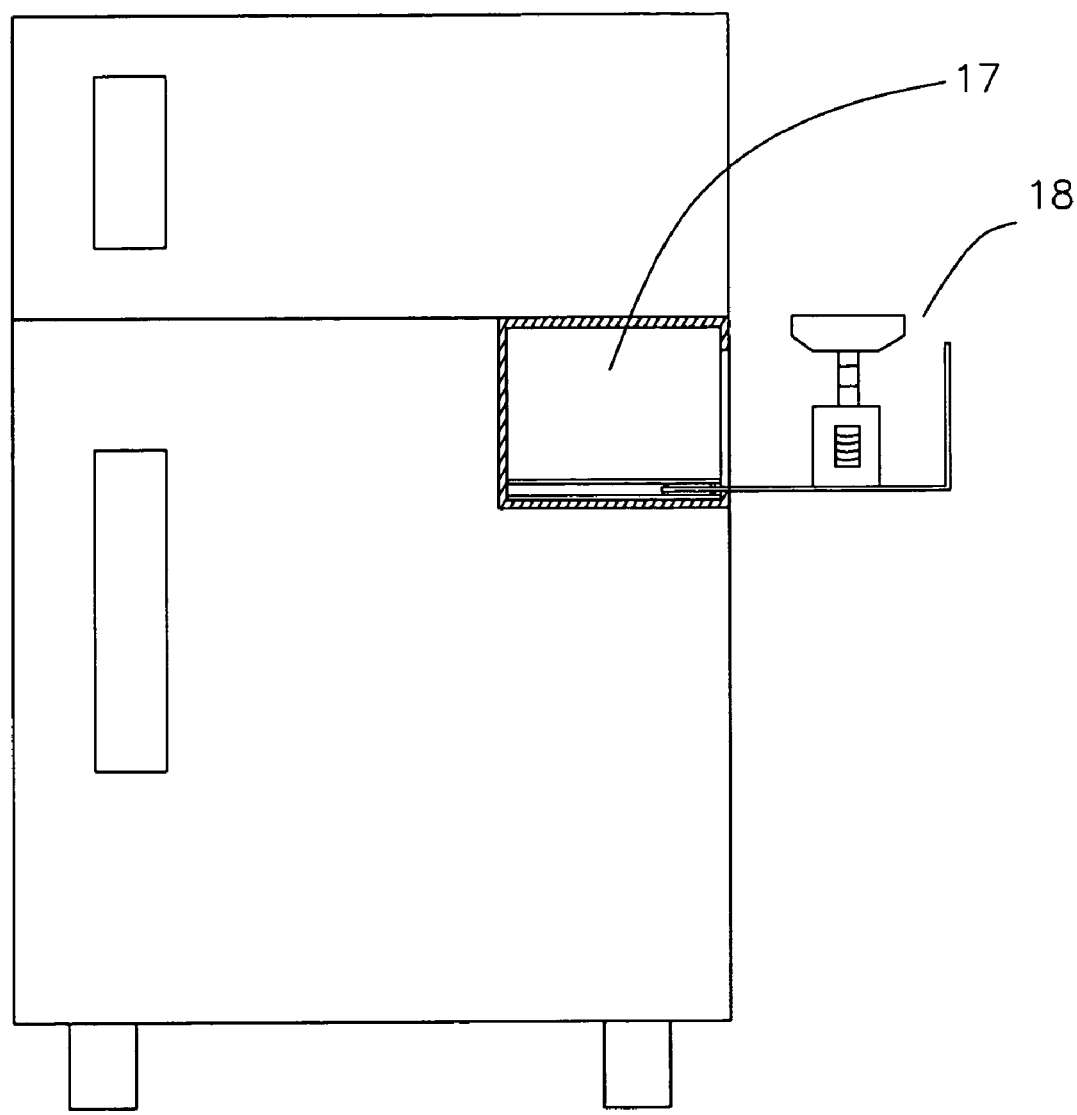
FIG. 3 schematically illustrates a weighing scale being arranged to a refrigerator according to still another embodiment of the present invention.

In FIG. 3, in still another embodiment of the present invention, a refrigerator arranged with an electronic scale is shown. The configuration of this embodiment is similar to that of the microwave oven arranged with the weighing scale 14, as described above. In the refrigerator a box 17 is provided as a chamber to accommodate a weighing scale 18.

Figure 4:
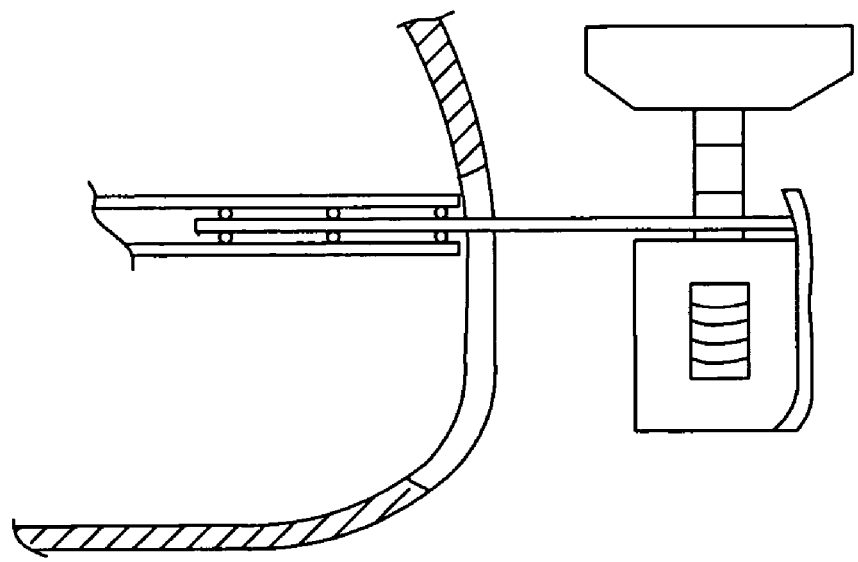
FIG. 4 is an enlarged view showing a weighing scale being integrally mounted with the ornamental baffle of a food treating apparatus.

As shown in FIG. 4, in the above embodiments, the sliding rail or sliding plate can be configured at other locations of the weighing scale. They can be arranged at the top of the casing of the weighing scale and can be formed integrally with the casing by injection moulding. The casing of the weighing scale can be formed integrally with the ornamental baffle, and the ornamental baffle will completely seal the opening of the chamber of the main body of the food treating apparatus.

Figure 5:
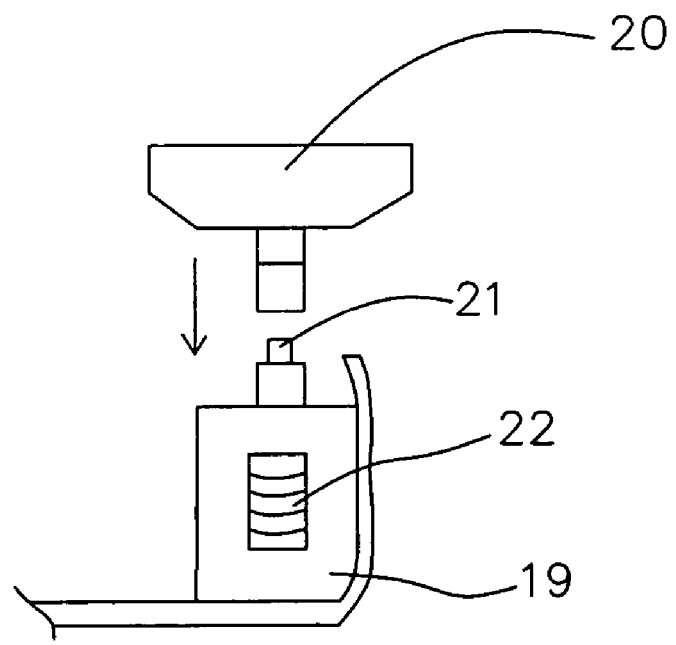
FIG. 5 is an enlarged view showing the structure of the support rod of a weighing scale.

As can be seen in FIG. 5, in the above embodiments, the weighing scale can be a spring scale which includes a weight display device 19, a weighing pan 20, a spring, a support rod 21 and a dial 22. The weighing span 20 and the weight display device 19 are connected via the support rod 21, which can be made from a plural of segments. The highest point of the segments which is connected to the weight display device 19 shall not lie higher than the top of the opening of the chamber.

The weighing scale in the present invention can also be used together with other types of food treating apparatus such as coffee makers, roasting ovens, etc.

From the forgoing, it will be appreciated that the specific embodiments of the invention have been described herein for purpose of illustration, but that various modifications, variations or adaptations may be made without departing from the spirit of the invention. Accordingly, the invention is not limited except as by the appended claims.

What is claimed is:

1. A food treating apparatus with a weighing scale in which said food treating apparatus includes a main body and a weighing scale and in which said weighing scale includes a casing, a weight display device and a weighing pan, wherein said casing of said weighing scale is provided with a sliding rail or a sliding plate, said main body of said food treating apparatus is provided with a chamber to accommodate said weighing scale, and a guiding rail for use in conjunction with said sliding rail or sliding plate is provided within said chamber, and wherein said weight display device and said weighing pan are connected via a support rod which is located between them, said support rod is made of a plural of segments which are detachably mounted with each other, and the highest point of the segments which is firmly connected to said weight display device does not lie higher than the top of said chamber.

2. A food treating apparatus with a weighing scale in accordance with claim 1, wherein said weighing scale is a spring scale which includes a spring, a support rod and a dial.

3. A food treating apparatus with a weighing scale in accordance with claim 1, wherein said weight display device is an electronic scale which includes a support rod, a weight sensor, a liquid crystal display and a scaling circuit.

* * * * *